3,077,485
2-FORMYL-Δ²-ANDROSTENES

Albert Bowers, John Edwards, and James C. Orr, all of Mexico City, Mexico, assignors, by mesne assignments, to Syntex Corporation, a corporation of Panama
No Drawing. Filed Aug. 3, 1961, Ser. No. 128,974
Claims priority, application Mexico Jan. 19, 1961
15 Claims. (Cl. 260—397.4)

The present invention relates to certain new cyclopentanophenanthrene derivatives and to a method for the preparation thereof.

More particularly, it relates to a method for preparing 2-formyl-Δ²-17β-hydroxy-androstenes, which may further possess a 17α-alkyl, alkenyl or alkinyl group, as well as their esters and the corresponding 19-nor-compounds.

Such compounds are hormones of the androgenic type, which show a favorable anabolic-androgenic ratio; they further possess anti-estrogenic activity, lower the blood cholesterol level and are good stimulants of the appetite.

The novel compounds which are obtained by the method object of the present invention are represented by the following formula:

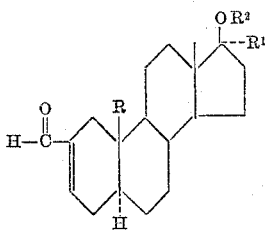

In the above formula R represents hydrogen or methyl; $R^1$ represents hydrogen, a lower alkyl group of 1 to 5 carbon atoms such as methyl, ethyl and propyl, or a lower alkenyl or alkinyl group such as vinyl, ethynyl or propynyl; $R^2$ represents hydrogen or an acyl group derived from a carboxylic acid of less than 12 carbon atoms, saturated or unsaturated, of straight, branched, cyclic or mixed cyclic-aliphatic chain, substituted or not with methoxy, halogen or other groups; typical such esters are the acetate, propionate, butyrate, valerate, hemi-succinate, enanthate, caproate, benzoate, undecenoate, trimethylacetate, phenoxyacetate, cyclopentylpropionate and β-chloropropionate.

By reduction of a 2-alkoxymethylene derivative of dihydroallotestosterone, 19-nor-dihydroallotestosterone, or of one of 17α-substituted derivatives thereof, with a double metal hydride there are obtained the respective 3-hydroxy derivatives. It has been discovered that such β-hydroxy enol-ether compounds are very unstable in acid medium and in the presence of a proton acceptor; under these conditions they dehydrate with simultaneous transformation of the 2-alkoxymethylene group into the respective aldehyde, thus giving rise to the formation of the 2-formyl-Δ²-androstenes. By esterification with the anhydrides or chlorides of carboxylic acids, by conventional methods, there are obtained the respective esters.

The method set forth above is illustrated by the following sequence of reactions:

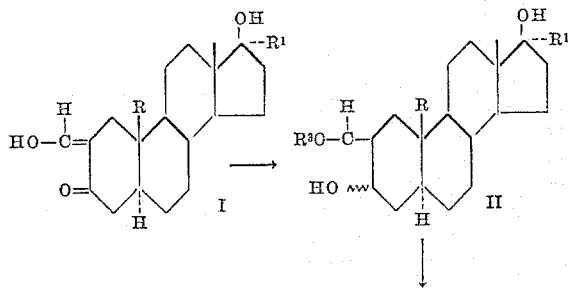

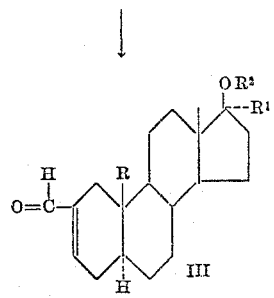

In the above formulas R, $R^1$ and $R^2$ have the same meaning as set forth previously; $R^3$ represents a lower alkyl group such as methyl, ethyl, propyl, etc. The wavy line indicates the α or β configuration of the 3-hydroxyl group.

In practicing the process set forth above, a 2-hydoxymethylene derivative of dihydroallotestosterone (I), which may further possess at C-17α a lower alkyl, alkenyl or alkynyl group, was converted into the corresponding ether, i.e., the 2-alkoxymethylene derivative (I), by reaction at room temperature and for a prolonged period of time, preferably for 15 to 24 hours, with a diazoalkane, such as diazomethane or diazoethane, or by refluxing with an alkyl iodide, such a methyl or isopropyl iodide, in the presence of anhydrous potassium carbonate and acetone.

By reduction of the 2-alkoxymethylene-androstan-17β ol-3-one or of one of its 17α-substituted derivatives (I: R=methyl) with a double metal hydride, such as sodium borohydride, at room temperature and in an adequate solvent, such as methanol, for a short period of time, preferably between 15 minutes and 2 hours, there is obtained a mixture of the 3α and 3β-hydroxy compounds, the 3β-isomer predominating in the mixture, thus affording the 2-alkoxymethylene-androstane-3β,17β-diols as well as their 17-alkyl, alkenyl and alkynyl derivatives (II: R=methyl). Alternatively, this reduction may be conducted through the use of tetrahydrofuran as solvent, for a prolonged period of time, between 36 and 48 hours.

When the product obtained in the above reduction is subjected to an acid treatment, using for example hydrochloric acid or dilute sulfuric acid in the presence of a proton acceptor, such as acetone, which may also be the solvent employed for the reaction, or which may be used in a small amount when using another solvent such as ethyl acetate, at a temperature between 0° and 25° C., there is produced an immediate dehydration with the simultaneous transformation of the alkoxymethylene group, thus giving rise to the 2-formyl-Δ²-androstenes, that is, to 2-formyl-Δ²-androsten-17β-ol, 2-formyl-17α-alkyl-Δ²-androsten-17β-ol, 2-formyl-17α-alkenyl-Δ²-androsten-17β-ol and 2-formyl-17α-alkinyl - Δ² - androsten-17β-ol (III: R=methyl).

The same 2-formyl-Δ²-androsten derivatives may be also obtained by simply dissolving the β-hydroxy enolether (II) in acetic acid and keeping the solution at room temperature for a prolonged period of time.

In the same manner, by reduction with sodium borohydride of a 2-alkoxymethylene derivative of 19-nor-dihydroallotestosterone or of one of the 17α-substituted derivatives thereof, there are obtained the respective 3-alcohols, which upon treatment with acid furnish the corresponding 2-formyl-19-nor-Δ²-androstenes.

For preparing the esters of the compounds heretofore set forth, 2-formyl-Δ²-androsten-17β-ol or its 19-nor-analog are treated with an acid anhydride or chloride derived from a hydrocarbon carboxylic acid of the type described previously, in solution in pyridine and benzene, or simply using pyridine as solvent, at room temperature for several hours, or heating under reflux or on the steam bath for 1 hour.

The esters of the 17α-substituted compounds are obtained by treatment with an acid anhydride or chloride in benzene solution and in the presence of p-toluenesulfonic acid as catalyst.

The following examples serve to illustrate but are not intended to limit the scope of the invention:

*Example I*

A suspension of 5 g. of 2-methoxymethylene-dihydro-allotestosterone, obtained by etherification of 2-hydroxymethylene-dihydroallotestosterone with diazomethane, in 75 cc. of methanol was cooled to 0–5° C. and treated dropwise under stirring with a solution of 6 g. of sodium borohydride in 30 cc. of methanol. The reaction mixture was stirred for 2 hours further at room temperature, the excess of reagent was then destroyed by the addition of a few drops of glacial acetic acid and the mixture was poured into water; the precipitate was collected by filtration, washed and dried. Crystallization from acetone yielded 2 - methoxymethylene - androstane - 3β,17β - diol, M.P. 158–160° C., $[\alpha]_D$ —35° (chloroform).

A stirred suspension of 2 g. of the above compound in 20 cc. of acetone was treated at room temperature with 2 drops of concentrated hydrochloric acid; after 2 minutes the starting material had dissolved and the aldehyde resulting from the reaction precipitated spontaneously; it was collected by filtration and recrystallized from ethyl acetate, thus affording 2-formyl-Δ$^2$-androsten-17β-ol; M.P. 196–198° C., $[\alpha]_D$ —107° (chloroform), λ max. 232, 309 mμ, log ε 4.08, 1.64.

In another experiment 1 g. of the steroid was dissolved in 20 cc. of ethyl acetate and treated with 1 drop of concentrated hydrochloric acid and 2 drops of acetone, thus affording also the 2-formyl-Δ$^2$-androsten-17β-ol, identical with the product obtained by the above method.

*Example II*

In accordance with the method described in Example I, 2 g. of 2-methoxymethylene-17α-methyl-dihydroallotestosterone was reduced with sodium borohydride to produce 2-methoxymethylene-17α-methyl-androstane-3β,17β-diol, with M.P. 146–149° C., $[\alpha]_D$ —53° (chloroform).

The above compound was dissolved in 20 cc. of acetone, cooled to 0° C. and treated with 1 drop of concentrated hydrochloric acid. The solution was stirred for 5 minutes at 0° C., slowly treated with water until complete precipitation and the product was collected, thus giving 2-formyl-17α-methyl-Δ$^2$-androsten-17β-ol; M.P. 138–140° C., $[\alpha]_D$ +70° (chloroform), λ max. 232, 313 mμ, log ε 4.10, 1.59.

*Example III*

A solution of 1.25 g. of 2-methoxymethylene-17α-methyl-androstane-3β,17β-diol in 50 cc. of acetic acid was kept standing for 10 hours at room temperature; the precipitate formed was collected, washed with water to neutral, dried under vacuum and recrystallized from acetone-water, thus furnishing 550 mg. of 2-formyl-17α-methyl-Δ$^2$-androsten-17β-ol, identical with the one obtained in the preceding example.

*Example IV*

To a solution of 5 g. of 2-hydroxymethylene-17α-ethyl-androstan-17β-ol-3-one in 100 cc. of methanol was added an ether solution of diazomethane prepared from 2 g. of nitrosomethylurea and the mixture was kept overnight at room temperature; a few drops of acetic acid were then added and the mixture was concentrated until 2-methoxymethylene-17α-ethyl-androstan-17β-ol-3-one separated in crystalline form.

A solution of 1 g. of the above product in 50 cc. of tetrahydrofuran was treated with a suspension of 1 g. of sodium borohydride in 10 cc. of tetrahydrofuran and the mixture was stirred for 48 hours at room temperature; the excess of reagent was then destroyed with 1 cc. of acetic acid, water was added until complete precepitation and the product was collected by filtration, thus affording a mixture of 2-methoxymethylene-17α-ethyl-androstane-3β,17β-diol and its 3α-epimer, which was used for the next step without further purification.

The above crude diol was treated with hydrochloric acid in acetone, by following the method described in Example I, to produce 2-formyl-17α-ethyl-Δ$^2$-androsten-17β-ol.

*Example V*

The method of Example I was repeated, but using as starting compounds 2-hydroxymethylene-19-nor-androstan-17β-ol-3-one and 2-hydroxymethylene-17α-methyl-19-nor-androstan-17β-ol-3-one, thus obtaining as final products 2-formyl-19-nor-Δ$^2$-androsten-17β-ol and 2-formyl-17α-methyl-19-nor-Δ$^2$-androsten-17β-ol.

*Example VI*

A solution of 500 mg. of 2-formyl-Δ$^2$-androsten-17β-ol in 2 cc. of pyridine and 1 cc. of acetic anhydride was kept overnight at room temperature, then poured into water and the precipitate formed was collected by filtration and dried under vacuum. Crystallization from acetone-hexane afforded the acetate of 2-formyl-Δ$^2$-androsten-17β-ol; M.P. 161–163° C., $[\alpha]_D$ +84° (chloroform).

By the same method, but using 2-formyl-19-nor-Δ$^2$-androsten-17β-ol there was obtained the corresponding acetate.

*Example VII*

From a solution of 500 mg. of 2-formyl-Δ$^2$-androsten-17β-ol in 100 cc. of benzene there was distilled 25 cc. in order to remove moisture and then 0.27 cc. of pyridine and 0.75 cc. of undecenoyl chloride were added; the mixture was refluxed under anhydrous conditions for 1 hour, cooled and the solution was filtered through 15 g. of alumina, then eluting the column with 1 l. of benzene; the solvent was evaporated and the residue chromatographed, thus furnishing the undecenoate of 2-formyl-Δ$^2$-androsten-17β-ol as an amorphous solid; $[\alpha]_D$ +65° (chloroform), λ max. 232, 311, log ε 4.11, 1.69.

*Example VIII*

By following the method described by H. J. Ringold et al., J.A.C.S., 81, 427 (1959), 5 g. of 17α-ethynyl-dihydroallotestosterone was condensed with ethyl formate in benzene solution and in the presence of sodium hydride, and the resulting 2-hydroxymethylene derivative was converted into the respective methyl ether by treatment with diazomethane. By following the method described in Example I, the above compound was successively transformed into 2-methoxymethylene-17α-ethynyl-androstane-3,17β-diol and 2-formyl-17α-ethynyl-Δ$^2$-androsten-17β-ol.

A mixture of 1 g. of the above compound, 50 cc. of benzene, 2 cc. of acetic anhydride and 500 mg. of paratoluenesulfonic acid was kept at room temperature for 24 hours and then diluted with water; the benzene layer was separated, consecutively washed with 5% aqueous sodium carbonate solution and water, dried over anhydrous sodium sulfate and evaporated to dryness under reduced pressure. By chromatography of the residue followed by crystallization from acetone-hexane of the solid fractions there was obtained the acetate of 2-formyl-17α-ethynyl-Δ$^2$-androsten-17β-ol.

*Example IX*

In the method of the preceding example there was substituted the 17α-ethynyl-dihydroallotestosterone by 17α-vinyl-dihydroallotestosterone, thus obtaining consecutively 2-methoxymethylene-17α-vinyl-androstan-17β-ol-3-one, 2-methoxymethylene-17α-vinyl-androstane-3,17β-diol and 2-formyl-17α-vinyl-Δ$^2$-androsten-17β-ol; the latter compound was esterified with caproic anhydride in benzene solution and in the presence of paratoluenesulfonic acid, following the method described in the preceding example, thus giving the caproate of 2-formyl-17α-vinyl-Δ²-androsten-17β-ol.

Example X

A solution of 1.5 g. of 2-hydroxymethylene-19-nor-dihydroallotestosterone in 50 cc. of methanol was treated with an excess of an ether solution of diazoethane.

The resulting ethyl ether was allowed to react with 1.7 g. of sodium borohydride in methanol solution, in accordance with the procedure of Example 1, but stirring for only 15 minutes at room temperature, thus obtaining 2-ethoxymethylene-19-nor-androstane-3,17β-diol. By reaction of this compound with hydrochloric acid in acetone, in accordance with the method of Example I, there was finally obtained 2-formyl-19-nor-Δ²-androsten-17β-ol, identical with the compound obtained in Example V.

By subsequent esterification with propionic anhydride in pyridine, in accordance with the method of Example VI, there was produced the corresponding propionate.

Example XI

The method of Example VIII was repeated, but using as starting compound 17α-ethynyl-19-nor-dihydroallotestosterone, thus obtaining consecutively 2-hydroxymethylene - 17α - ethynyl-19-nor-dihydroallotestosterone, 2-methoxymethylene - 17α - ethynyl-19-nor-dihydroallotestosterone, 2-methoxymethylene-17α-ethynyl-19-nor-androstane-3,17β-diol, 2 - formyl-17α-ethynyl-19-nor-Δ²-androsten-17β-ol and 2-formyl-17α-ethynyl-19-nor - Δ² - androsten-17β-ol acetate.

Example XII

By following the method of Example VI, but using propionic or valeric anhydride as esterifying agents, 2-formyl-Δ²-androsten-17β-ol was converted into the propionate of 2-formyl-Δ²-androsten-17β-ol, M.P. 140–144° C., $[\alpha]_D$ +74° (chloroform), λ max. 232, 310 mμ, log ε 4.13, 1.64, and the valerate of 2-formyl-Δ²-androsten-17β-ol, $[\alpha]_D$ +69° (chloroform), λ max. 232, 308 mμ, log ε 4.03, 1.67.

Example XIII

By following the esterification method of Example VIII 2-formyl-17α-methyl-Δ²-androsten-17β-ol was treated with acetic anhydride in benzene solution and in the presence of p-toluenesulfonic acid, thus producing the acetate of 2-formyl-17α-methyl-Δ²-androsten-17β-ol.

In a similar manner, but using caproic and cyclopentylpropionic anhydrides as esterifying agents, there were obtained the caproate and cyclopentylpropionate of 2-formyl-17α-methyl-Δ²-androsten-17β-ol.

We claim:
1. A compound of the following formula:

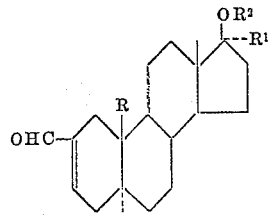

wherein R is selected from the group consisting of hydrogen and methyl; R¹ is selected from the group consisting of hydrogen, a lower alkyl group, a lower alkenyl group and a lower alkynyl group; and R² is selected from the group consisting of hydrogen and a hydrocarbon carboxylic acyl group of less than 12 carbon atoms.
2. 2-formyl-Δ²-androsten-17β-ol.
3. 2-formyl-17α-methyl-Δ²-androsten-17β-ol.
4. 2-formyl-17α-vinyl-Δ²-androsten-17β-ol.
5. 2-formyl-17α-ethynyl-Δ²-androsten-17β-ol.
6. 2-formyl-19-nor-Δ²-androsten-17β-ol.
7. 2-formyl-17α-methyl-19-nor-Δ²-androsten-17β-ol.
8. 2-formyl-17α-ethynyl-19-nor-Δ²-androsten-17β-ol.
9. The hydrocarbon carboxylic acid esters of less than 12 carbon atoms of 2-formyl-Δ²-androsten-17β-ol.
10. The acetate of 2-formyl-Δ²-androsten-17β-ol.
11. The propionate of 2-formyl-Δ²-androsten-17β-ol.
12. The valerate of 2-formyl-Δ²-androsten-17β-ol.
13. The undecenoate of 2-formyl-Δ²-androsten-17β-ol.
14. The acetate of 17α-methyl-2-formyl-Δ²-androsten-17β-ol.
15. A process for producing a 2-formyl-Δ²- androsten-17β-ol comprising reducing a 2-lower alkoxymethylene-androsten-17β-ol-3-one with a double metal hydride and treating the thus formed 2-lower alkoxymethylene-androstan-3,17β-diol with a mineral acid selected from the group consisting of hydrochloric acid and sulfuric acid in the presence of a proton acceptor and acetic acid.

No references cited.